United States Patent
Ostrovsky et al.

(10) Patent No.: US 8,276,111 B2
(45) Date of Patent: Sep. 25, 2012

(54) PROVIDING ACCESS TO A DATASET IN A TYPE-SAFE MANNER

(75) Inventors: Igor Ostrovsky, Bellevue, WA (US); John Duffy, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 939 days.

(21) Appl. No.: 12/339,556

(22) Filed: Dec. 19, 2008

(65) Prior Publication Data
US 2010/0162211 A1    Jun. 24, 2010

(51) Int. Cl.
*G06F 17/00* (2006.01)
(52) U.S. Cl. .................. 717/102; 707/999.102; 713/173
(58) Field of Classification Search .................. 717/114, 717/102, 140, 154
See application file for complete search history.

(56) References Cited

U.S. PATENT DOCUMENTS

| | | | | |
|---|---|---|---|---|
| 4,625,081 | A * | 11/1986 | Lotito et al. | 379/88.26 |
| 5,696,974 | A | 12/1997 | Agrawal et al. | |
| 6,037,950 | A * | 3/2000 | Meir et al. | 345/427 |
| 6,148,292 | A * | 11/2000 | Reisinger et al. | 705/30 |
| 6,978,018 | B2 * | 12/2005 | Zimmer | 380/30 |
| 7,086,041 | B2 | 8/2006 | Plesko et al. | |
| 7,113,896 | B2 * | 9/2006 | Zhang et al. | 703/2 |
| 7,162,626 | B2 * | 1/2007 | Zimmer et al. | 713/2 |
| 7,171,655 | B2 * | 1/2007 | Gordon et al. | 717/146 |
| 7,346,901 | B2 * | 3/2008 | Syme et al. | 717/148 |
| 7,673,109 | B2 * | 3/2010 | Wrighton et al. | 711/163 |
| 7,810,086 | B2 * | 10/2010 | Murphy et al. | 717/159 |
| 2004/0216086 | A1 | 10/2004 | Bau | |
| 2006/0031233 | A1 | 2/2006 | Liu et al. | |
| 2006/0242187 | A1 * | 10/2006 | Scharf | 707/102 |
| 2007/0169040 | A1 | 7/2007 | Chen | |
| 2007/0256060 | A1 * | 11/2007 | Ryu et al. | 717/140 |
| 2008/0082972 | A1 * | 4/2008 | De Sutter et al. | 717/154 |
| 2009/0132447 | A1 * | 5/2009 | Milenova et al. | 706/12 |
| 2010/0280988 | A1 * | 11/2010 | Underkoffler et al. | 706/58 |

OTHER PUBLICATIONS

Allison, Lloyd, "The Types of Models", Retrieved at <<http://www.csse.monash.edu.au/~lloyd/tildeFP/2003HICS/200306.ps>>, Mar. 15, 2003, pp. 1-13.
Harper, et al., "Compiling Polymorphism Using Intensional Type Analysis", Retrieved at <<http://citeseerx.ist.psu.edu/viewdoc/summary?doi=10.1.1.43.8090>>, Sep. 2, 1994, pp. 25.
Fraine, et al., "Eco: A Flexible, Open and Type-Safe Framework for Aspect-Oriented Programming", Retrieved at <<http://64.233.183.104/search?q=cache:oyPGXxf4fBwJ:ssel.vub.ac.be/files/defraine-eco06a.pdf>>, Jan. 2006, pp. 1-33.
Hejlsberg, "Part II C# 2.0", Retrieved at http://www.informit.com/content/images/0321154916/samplechapter/hejlsbergchl9.pdf, dated Oct. 10, 2003; 18 pgs.
Juval Lowy, "An Introduction to C# Generics", Retrieved at http://msdn.microsoft.com/en-us/library/ms379564.aspx; dated Jan. 2005; 25 pgs.

(Continued)

*Primary Examiner* — Don Wong
*Assistant Examiner* — Mohammad Kabir

(57) ABSTRACT

A method of providing access to a dataset in a type-safe manner includes storing a dataset including a plurality of data elements and a corresponding plurality of order keys for indicating an ordering of the data elements. Each order key is associated with one of the data elements. An interface to the dataset is generated that is parameterized by an element type parameter and a key type parameter. The interface is configured to provide access to the data elements and the order keys in the dataset in a type-safe manner.

16 Claims, 5 Drawing Sheets

OTHER PUBLICATIONS

David Wallwork, "Type Checker Overview", Retrieved at http://www.basis.com/solutions/TypeChecker_Overview.pdf; dated Aug. 28, 2006; 10 pgs.
Wikipedia, "Type System", Retrieved at http://en.wikipedia.org/wiki/Type_system; dated Dec. 18, 2008; 11 pgs.
Microsoft Corporation, Generic Classes (C# Programming Guide); Retrieved at http://msdn.microsoft.com/en-us/library/sz6zd40f.aspx; dated 2008; 3 pgs.
Wikipedia, "Data Type", Retrieved at http://en.wikipedia.org/wiki/Data_type; dated Dec. 10, 2008; 3 pgs.
Wikipedia, "Type Polymorphism", Retrieved at http://en.wikipedia.org/wiki/Type_polymorphism; dated Dec. 10, 2008; 6 pgs.
Wikipedia, "Generics in Java", Retrieved at http://en.wikipedia.org/wiki/Generics_in_Java; dated Dec. 16, 2008; 5 pgs.

* cited by examiner

PROVIDING ACCESS TO A DATASET IN A TYPE-SAFE MANNER

BACKGROUND

A type system is a system used in programming languages to aid in the detection and prevention of run-time errors. A programming language is "typed" if it contains a set of types that are declared for objects such as variables, functions, etc., and these types are checked versus a set of rules during compilation of a program written in the language. If the source code written in the typed language violates one of the type rules, a compiler error is determined. The process of verifying and enforcing type constraints (also referred to as type checking), may occur either at compile-time (i.e., static type checking) or run-time (dynamic type checking).

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

For a lazily ordered dataset, ordering information is stored explicitly, in addition to the elements. Typically, for each element, the lazily ordered data set also stores an associated order key. Ordering of the order keys determines the ordering of their associated elements.

One embodiment provides a method of providing access to a lazily ordered dataset in a type-safe manner. A dataset including data elements and order keys for indicating an ordering of the data elements is stored. Each order key is associated with one of the data elements. An interface to the dataset is generated that is parameterized by an element type parameter and a key type parameter. The interface provides access to the data elements and the order keys in the dataset in a type-safe manner.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

Figure 1:
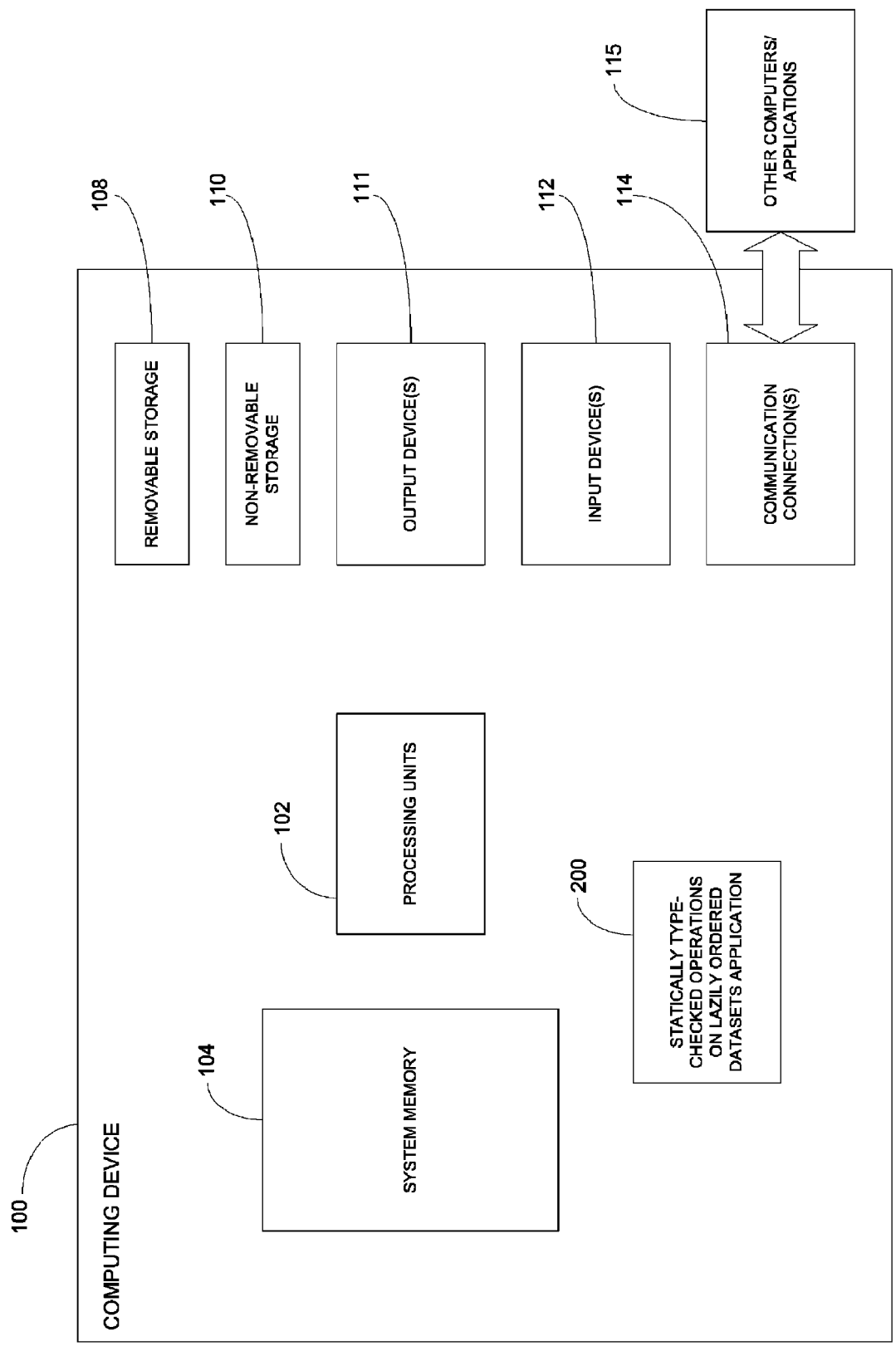
FIG. 1 is a diagram illustrating a computing device suitable for performing statically type-checked operations on lazily-ordered datasets according to one embodiment.

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides an application that performs statically type-checked operations on lazily ordered datasets, but the technologies and techniques described herein also serve other purposes in addition to these. In one implementation, one or more of the techniques described herein can be implemented as features within a framework program such as MICROSOFT® .NET Framework.

An ordered dataset is a data structure that stores a collection of data elements, as well as information that records their order. For example, to store the ordered dataset (5,3,5), the elements {3,5,5} are recorded, as well as the fact that the three is ordered between the two fives. A common way to store the ordering information in a dataset is to encode the ordering into the structure of the data representation, which is referred to herein as a "physically ordered dataset."

An example of a physically ordered dataset is an array whose elements are stored in computer memory in the desired order. Elements of an array are understood to be ordered based on their ordering in memory. As another example, elements of a singly-linked list data structure can be understood to be ordered based on the order in which they would be accessed during a forward traversal over the linked list.

In contrast to a physically ordered dataset, a "lazily ordered dataset", as used herein, may not have its elements structurally arranged in the element order. Rather, ordering information is stored explicitly, in addition to the elements. Typically, for each element, the lazily ordered data set also stores an associated order key. Ordering of the order keys determines the ordering of their associated elements. For example, if the order key for element A comes before the order key for element B, then element A comes before element B in the element order.

Datasets are typically processed by sequence operations. A sequence operation takes a dataset as an input and produces another dataset as an output. The sequence operation may change the order keys, change the elements, or change both the order keys and the elements. For example, some sequence operations sort the dataset based on some key, filter out some of the elements, or project each element.

Operations on lazily ordered datasets have several advantages over operations on physically ordered datasets. Some operations compose more efficiently when working on lazily ordered datasets than when working on physically ordered datasets. For example, consider a Sort operation (which sorts a dataset on some key) followed by a First operation (which returns the first element according to the order). If implemented using lazy ordering, the Sort operation will simply associate order keys with elements, but perform no further work, and the First operation will scan the dataset and find an element with the lowest order key. However, for a physically ordered dataset, Sort would fully sort the entire input, and the time complexity would be increased. Similarly, if a lazily-ordered dataset is sorted multiple times, only the last sort will take place.

Another advantage of lazily-ordered datasets is that they work well in data-parallel programming. In a data-parallel scenario, different computing threads are operating on different partitions of the input data. If threads sort the data at some intermediate stage of the computation, it is often beneficial to do it lazily. Otherwise, in order to do an eager sort, all threads would have to wait on each other, which is a costly operation. Although lazily-ordered datasets have advantages, as discussed above, providing a type-safe implementation of these datasets and operations on them is a challenging task.

FIG. 1 is a diagram illustrating a computing device 100 suitable for performing statically type-checked operations on lazily-ordered datasets according to one embodiment. In the illustrated embodiment, the computing system or computing device 100 includes a plurality of processing units (i.e., processors or threads) 102 and system memory 104. Depending on the exact configuration and type of computing device, memory 104 may be volatile (such as RAM), non-volatile (such as ROM, flash memory, etc.), or some combination of the two.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one embodiment, computing device 100 includes statically type-checked operations on lazily ordered datasets application 200. Statically type-checked operations on lazily ordered datasets application 200 is described in further detail below with reference to FIG. 2.

Figure 2:
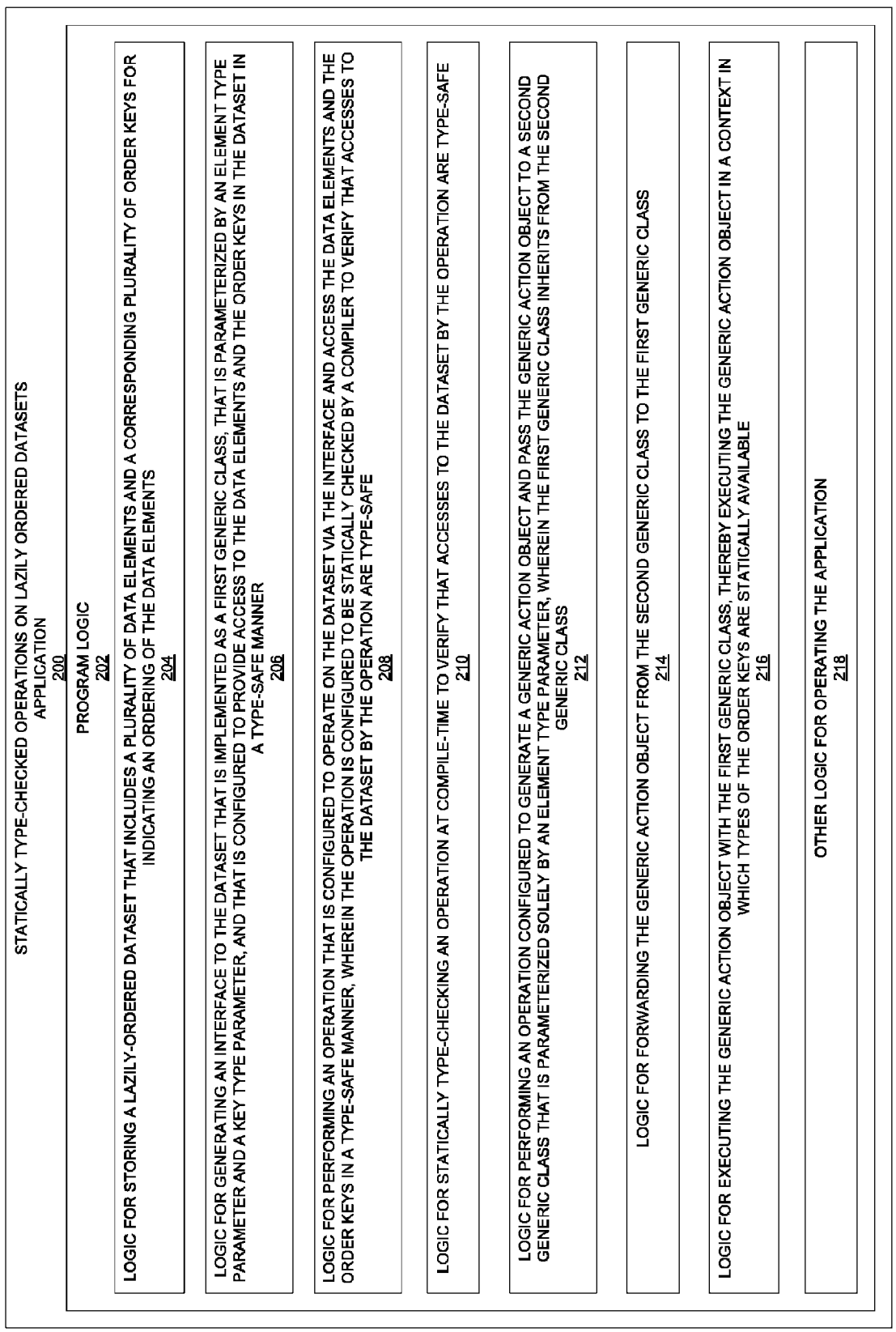
FIG. 2 is a diagrammatic view of a statically type-checked operations on lazily ordered datasets application for operation on the computing device illustrated in FIG. 1 according to one embodiment.

FIG. 2 is a diagrammatic view of a statically type-checked operations on lazily ordered datasets application 200 for operation on the computing device 100 illustrated in FIG. 1 according to one embodiment. Application 200 is one of the application programs that reside on computing device 100. However, application 200 can alternatively or additionally be embodied as computer-executable instructions on one or more computers and/or in different variations than illustrated in FIG. 1. Alternatively or additionally, one or more parts of application 200 can be part of system memory 104, on other computers and/or applications 115, or other such suitable variations as would occur to one in the computer software art.

Statically type-checked operations on lazily ordered datasets application 200 includes program logic 202, which is responsible for carrying out some or all of the techniques described herein. Program logic 202 includes logic 204 for storing a lazily-ordered dataset that includes a plurality of data elements and a corresponding plurality of order keys for indicating an ordering of the data elements; logic 206 for generating an interface to the dataset that is implemented as a first generic class, that is parameterized by an element type parameter and a key type parameter, and that is configured to provide access to the data elements and the order keys in the dataset in a type-safe manner; logic 208 for performing an operation that is configured to operate on the dataset via the interface and access the data elements and the order keys in a type-safe manner, wherein the operation is configured to be statically checked by a compiler to verify that accesses to the dataset by the operation are type-safe; logic 210 for statically type-checking an operation at compile-time to verify that accesses to the dataset by the operation are type-safe; logic 212 for performing an operation configured to generate a generic action object and pass the generic action object to a second generic class that is parameterized solely by an element type parameter, wherein the first generic class inherits from the second generic class; logic 214 for forwarding the generic action object from the second generic class to the first generic class; logic 216 for executing the generic action object with the first generic class, thereby executing the generic action object in a context in which types of the order keys are statically available; and other logic 218 for operating the application.

Figure 3:
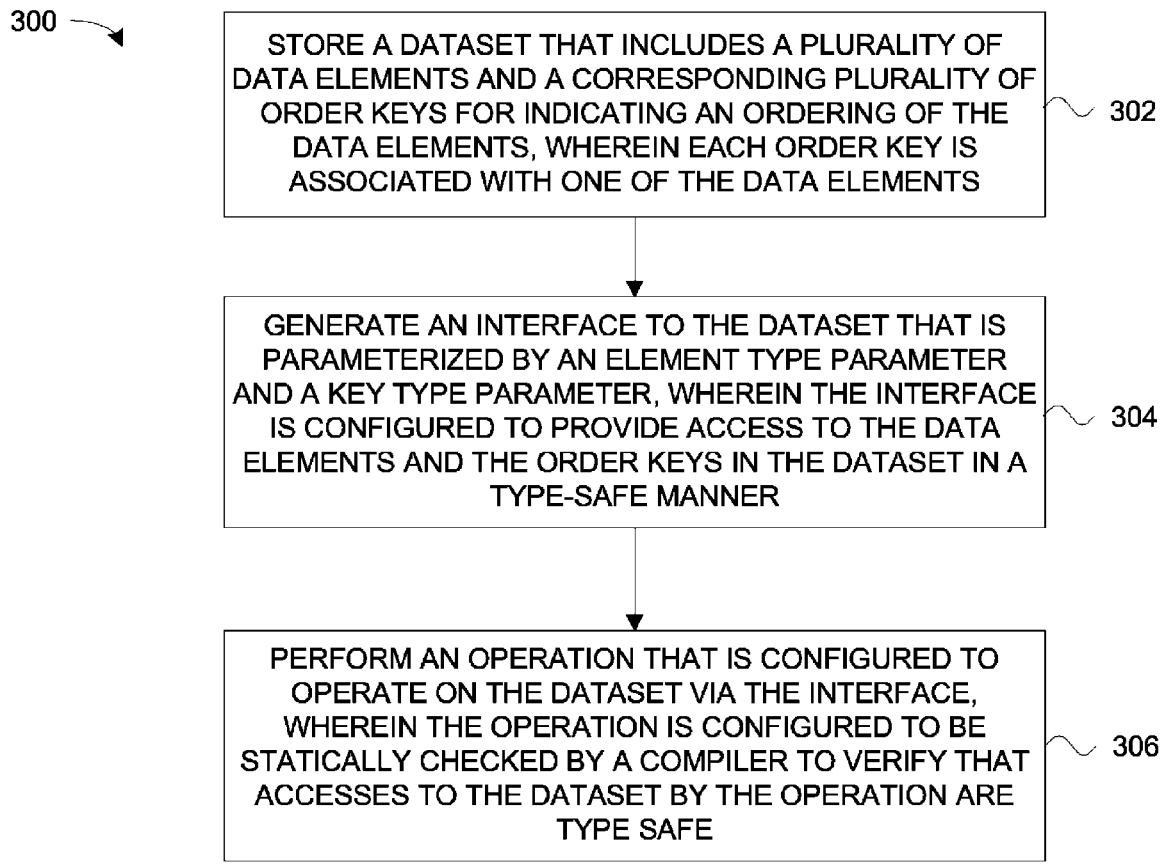
FIG. 3 is a flow diagram illustrating a method for providing access to a dataset in a type-safe manner.
Figure 4:
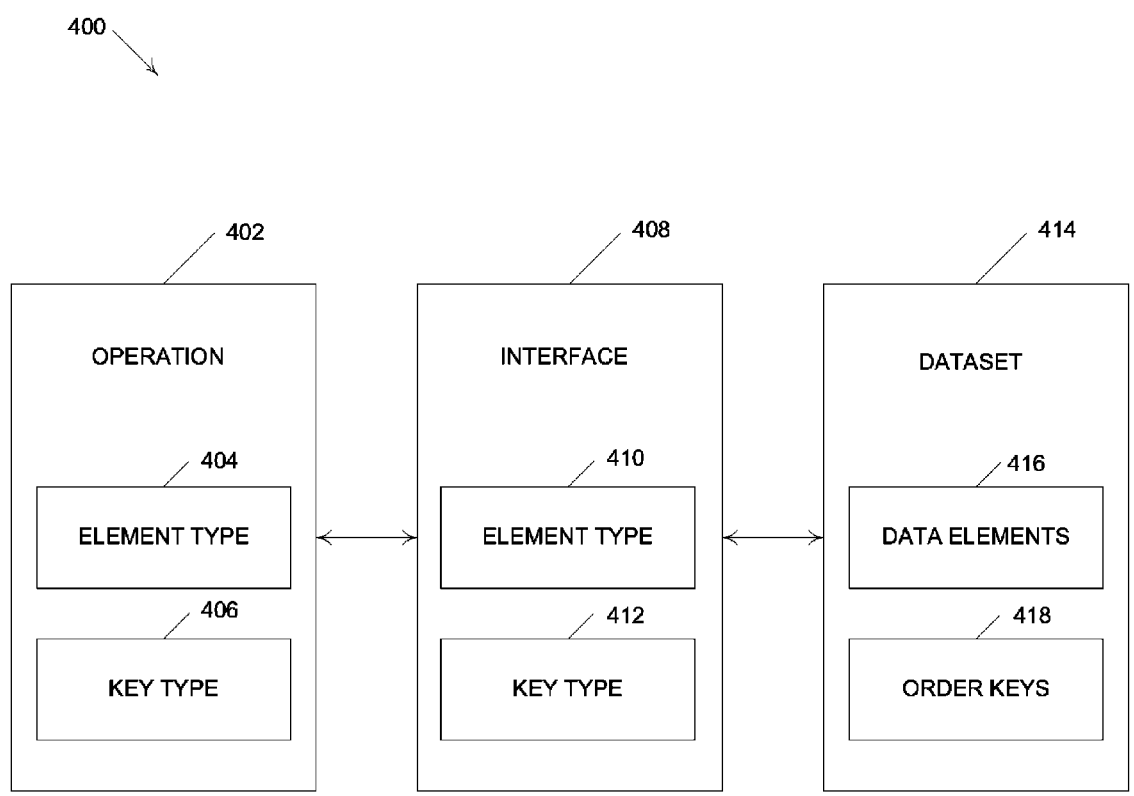
FIG. 4 is a block diagram illustrating a system for operating on a dataset in a type-safe manner according to one embodiment.
Figure 5:
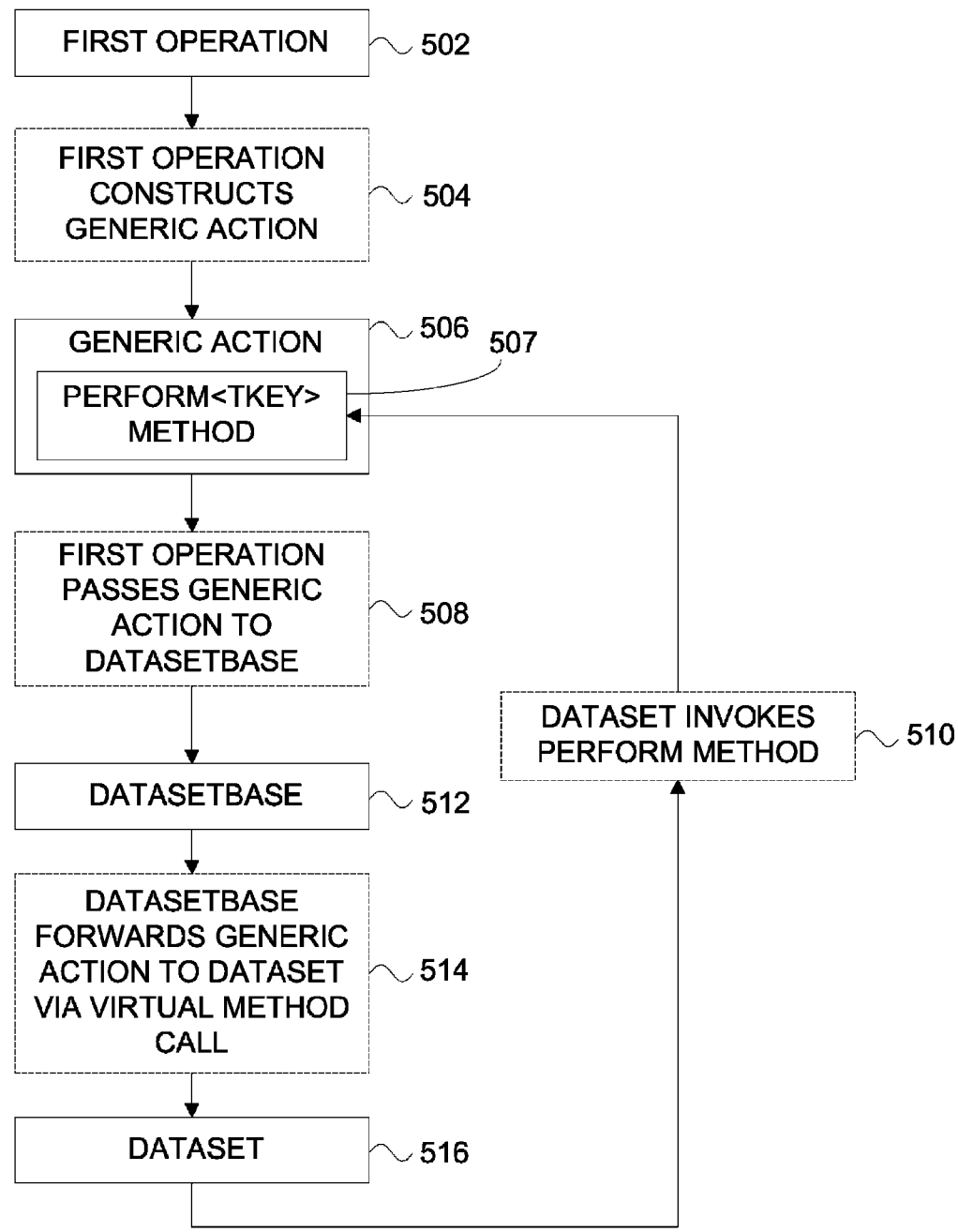
FIG. 5 is a diagram illustrating a method for implementing an operation on a dataset in a key polymorphic form according to one embodiment.

Turning now to FIGS. 3-5, techniques for implementing one or more embodiments of statically type-checked operations on lazily ordered datasets application 200 are described in further detail. In some implementations, the techniques illustrated in FIGS. 3-5 are at least partially implemented in the operating logic of computing device 100.

FIG. 3 is a flow diagram illustrating a method 300 for providing access to a dataset in a type-safe manner. At 302, a dataset is stored that includes a plurality of data elements and a corresponding plurality of order keys for indicating an ordering of the data elements, wherein each order key is associated with one of the data elements. Since the dataset stored at 302 includes order keys associated with the data elements, the dataset is referred to herein as a lazily-ordered dataset. At 304, an interface to the dataset is generated that is parameterized by an element type parameter and a key type parameter, wherein the interface is configured to provide access to the data elements and the order keys in the dataset in a type-safe manner.

At 306, an operation is performed that is configured to operate on the dataset via the interface, wherein the operation is configured to be statically checked by a compiler to verify that accesses to the dataset by the operation are type-safe. In one embodiment, the operation performed at 306 is configured to be statically verified at compile time to satisfy type safety constraints, and is configured to access the data elements and the order keys in a type-safe manner. In one embodiment, multiple operations are performed at 306, and the operations are statically or dynamically composed.

FIG. 4 is a block diagram illustrating a system 400 for operating on a dataset in a type-safe manner according to one embodiment. System 400 includes operation 402, interface 408, and dataset 414. Operation 402 is parameterized by parameters 404 and 406. In the illustrated embodiment, parameter 404 is an element type parameter, and parameter 406 is a key type parameter. Interface 408 is parameterized by parameters 410 and 412. In the illustrated embodiment, parameter 410 is an element type parameter, and parameter 412 is a key type parameter. Dataset 414 includes a plurality of data elements 416 and a corresponding plurality of order keys 418 for indicating an ordering of the data elements 416, wherein each order key is associated with one of the data elements.

Since the dataset 414 includes order keys 418 associated with the data elements 416, the dataset 414 is referred to herein as a lazily-ordered dataset. The interface 408 is configured to provide access to the data elements 416 and the order keys 418 in the dataset 414 in a type-safe manner for one or more operations, such as operation 402. Operation 402 is configured to operate on the dataset 414 via the interface 408. In one embodiment, the operation 402 is configured to be statically checked by a compiler to verify that accesses to the dataset 414 by the operation 402 are type-safe.

In one embodiment, interface 408 is implemented as a generic class as shown in the following Pseudo Code Example I:

---
PSEUDO CODE EXAMPLE I
---
class DataSet<TElement, TKey>
{
    public IEnumerator<Pair<TElement, TKey>> GetContents( ) {...}
    public IComparer<TKey> GetComparer( ) {...}
}
---

A generic class, such as that given in Example I above, is parameterized by the types of data that the class stores and manipulates. The generic type parameters are specified between angle brackets, <>, after the class name. The generic type parameters act as placeholders until an actual type is specified at use. Instances of the class accept the type for which they are created and store data of that type without conversion. Generics allow type-safe data structures to be defined without committing to actual data types. In the .NET framework, the compiled representation of a generic type is intermediate language (IL) instructions and metadata. The compiled representation of the generic type encodes the existence and use of type parameters. The first time that an application creates an instance of a constructed generic type, the just-in-time (JIT) compiler of the .NET Common Language Runtime (CLR) converts the generic IL and metadata to native code, substituting actual types for type parameters in the process. Subsequent references to that constructed generic type then use the same native code. The process of creating a specific constructed type from a generic type is known as generic type instantiation.

As shown in Example I, the generic class implementation of interface 408 is parameterized by the generic type parameters TElement and TKey, which correspond to the element type parameter 410 and the key type parameter 412, respectively. A generic class, such as that given in Example I, may include one or more generic methods that each include one or more generic type parameters specified in angle brackets, <>, following the method name. When calling a generic method, type arguments are given in angle brackets in the method invocation. As shown in Example I, the interface 408 includes a generic GetContents( ) enumerator method (parameterized by a generic element type parameter and a generic key type parameter), which returns an enumerator over element/key pairs. By iterating over the returned enumerator, the user of this class can access all elements 416 in the dataset 414, together with their order keys 418. The generic GetComparer( ) method in Example I is parameterized by a generic key type parameter and returns a class that can compare any two order keys and decide whether they differ, and if they do, identify which key is smaller in value.

In one embodiment, operations on datasets, such as operation 402, are implemented as shown in the following Pseudo Code Example II:

---
PSEUDO CODE EXAMPLE II
---
public static DataSet<TOutputElement, TOutputKey>
    Operation<TInputElement, TInputKey, TOutputElement, TOutputKey>(
    DataSet<TInputElement, TInputKey> input) { ... }
---

An operation, such as operation 402, can change the ordering of elements 416, change the values of elements 416, add elements 416, and remove elements 416 in dataset 414. The body of operation 402 can be statically checked by a compiler to ensure that all accesses to elements 416 and order keys 418 in dataset 414 are type-safe.

The general form of an operation given in Pseudo Code Example II may vary depending on the type of the operation. For example, a Sort operation, according to one embodiment, which sorts elements based on their values, is implemented as shown in the following Pseudo Code Example III:

---
PSEUDO CODE EXAMPLE III
---
public static DataSet<TInputElement, TInputElement>
    Sort<TInputElement, TInputKey>(
    DataSet<TInputElement, TInputKey> input)
{
... create and return a dataset that contains the same
elements as the input data set, but each element is also
its own order key ...
}
---

As another example, a Map operation, according to one embodiment, which creates a new dataset by applying a function to each element in the input, and constructs a dataset out of the outputs, is implemented as shown in the following Pseudo Code Example IV:

---
PSEUDO CODE EXAMPLE IV
---
public static DataSet<TOutputElement, TInputKey>
    Map<TInputElement, TInputKey, TOutputElement>(
        DataSet<TInputElement, TInputKey> input,
    Func<TInputElement, TOutputElement> F)
    {
    ... if the dataset is $e_1, e_2, .. e_n$, return the output
    dataset $F(e_1), F(e_2), ... F(e_n)$. The output dataset should
    be in the same order as the input dataset ...
    }
---

In many cases, it is useful to be able to abstract away the key type, and operate on the dataset 414 based only on element type. In one embodiment, the generic class, DataSet<TElement, TKey>, in Pseudo Code Example I, inherits from a second generic class DataSetBase<TElement>, which is parameterized solely by a generic element type parameter, and which is referred to herein as a dataset in a "key-polymorphic" form. Inheritance allows classes to easily share common features. A child class (also known as a derived class) inherits the properties of its parent (base) class, and is free to add features of its own. This allows classes to share common features.

In one embodiment, a lazily-ordered dataset is passed around in the key-polymorphic form, DataSetBase<TElement>, rather than in the original form, DataSet<TElement,TKey>. The signature of the Sort operation given in Pseudo Code Example III is simpler when applied to a dataset in the key-polymorphic form, as shown in the following Pseudo Code Example V:

---

PSEUDO CODE EXAMPLE V

---

```
public static DataSet<TInputElement, TInputElement>
    Sort<TInputElement >(
        DataSetBase<TInputElement>input)
```

---

Manipulating lazily-ordered datasets in the key-polymorphic form allows implementation of operations that can dynamically decide the type of the order key. For example, consider the OptionalSort operation given in the following Pseudo Code Example VI:

---

PSEUDO CODE EXAMPLE VI

---

```
public static DataSetBase<TInputElement>
    OptionalSort<TInputElement>(
        DataSetBase<TInputElement> source, bool performSort)
```

---

The OptionalSort operation given in Example VI decides whether to sort elements in a dataset based on the value of the "performSort" flag. If the flag is true, the OptionalSort operation changes the order keys of elements in the dataset. If the flag is false, the original keys will remain. By returning the dataset in the key-polymorphic form, the type of the order keys can be abstracted away, and OptionalSort can decide what that key type will be dynamically.

One issue that arises when order keys have been abstracted away is how to regain access to the order keys on a dataset in the key-polymorphic form. For example, given a reference to DataSetBase<TInputElement>, an issue that arises is how can some code be executed that can access both elements and keys, and have that code be statically type-checked. For example, assume that a First operation is implemented with a signature as shown in the following Pseudo Code Example VII:

---

PSEUDO CODE EXAMPLE VII

---

```
public static TInputElement First<TInputElement>(
    DataSetBase<TInputElement> source)
```

---

An issue that arises with respect to the First operation given in Example VII is that the operation does not have access to the TKey type. Without the TKey type, the operation is not able to manipulate keys in the source dataset in a type-safe fashion. One solution to this issue according to one embodiment is to use a generic callback mechanism. The generic callback mechanism according to one embodiment takes a dataset in the key-polymorphic form, and executes an operation on it in a context where it has access to the type of the order keys. In one embodiment of the generic callback mechanism, an object is constructed that represents an action that is to be executed in a context with access to the TKey type. A generic action is passed to the DataSetBase<TInputElement> object, which then forwards it to the concrete DataSet<TInputElement, TKey> implementation, which will finally execute the action in a context with access to the TKey type.

For example, given DataSetBase<TElement>, an operation First<TElement> can be implemented that finds the element in the dataset with the smallest key, and executes in a context where it can refer to the TKey type statically. FIG. 5 is a diagram illustrating a method 500 for implementing a First operation on a dataset in a key polymorphic form according to one embodiment. The method 500 begins with a First<TInputElement> operation 502. As indicated at 504, the First<TInputElement> operation 502 constructs a Generic Action object 506. As indicated at 508, the First<TInputElement> operation 502 passes the Generic Action object to DataSetBase<TInputElement> 512. As indicated at 514, the DataSetBase<TInputElement> 512 forwards the Generic Action object 506 to its derived class, DataSet<TInputElement, TKey> 516, via a virtual method call. As indicated at 510, DataSet<TInputElement, TKey> 516 invokes a perform method, GenericAction.Perform<TKey>( ) 507, to execute the generic action object. Consequently, the generic action executes in a context in which the types of the order keys are statically available.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of providing access to a dataset in a type-safe manner, comprising:
    storing a dataset including a plurality of data elements and a corresponding plurality of order keys for indicating an ordering of the data elements, each order key associated with one of the data elements;
    generating an interface to the dataset that is parameterized by an element type parameter for identifying a type of data element and a key type parameter for identifying a type of order key, wherein the interface is configured to provide access to the data elements and the order keys in the dataset in a type-safe manner; and
    performing an operation configured to operate on the dataset via the interface, wherein the operation is configured to be statically checked by a compiler to verify that accesses to the dataset by the operation are type-safe, wherein the operation is configured to perform at least one of changing an ordering of the data elements in the dataset, changing a value of at least one of the data elements in the dataset, adding data elements to the dataset, and removing data elements from the dataset.

2. The method of claim 1, wherein the operation is parameterized by an element type parameter and a key type parameter.

3. The method of claim 1, wherein the interface includes a generic enumerator method parameterized by an element type parameter and a key type parameter.

4. The method of claim 3, wherein the generic enumerator method is configured to return an enumerator for enumerating over pairs of data elements and corresponding order keys in the dataset.

5. The method of claim 1, wherein the interface includes a generic compare method parameterized by a key type parameter, and wherein the generic compare method is configured to compare two of the order keys in the dataset and determine a smaller one of the two order keys.

6. The method of claim 1, wherein the interface is implemented as a generic class.

7. The method of claim 6, wherein the element type parameter and the key type parameters are generic type parameters.

8. The method of claim 1, wherein the interface is a first generic class that inherits from a second generic class that is parameterized solely by an element type parameter.

9. The method of claim 8, and further comprising:
   performing an operation configured to generate a generic action object and pass the generic action object to the second generic class;
   forwarding the generic action object from the second generic class to the first generic class; and
   executing the generic action object with the first generic class, thereby executing the generic action object in a context in which types of the order keys are statically available.

10. A computer-readable storage medium storing computer-executable instructions for performing a method comprising:
    storing a dataset including a plurality of data elements and a corresponding plurality of order keys for indicating an ordering of the data elements, each order key associated with one of the data elements;
    generating an interface to the dataset that is parameterized by an element type parameter for identifying a type of data element and a key type parameter for identifying a type of order key, wherein the interface is configured to provide access to the data elements and the order keys in the dataset in a type-safe manner; and
    performing an operation configured to operate on the dataset via the interface, wherein the operation is configured to be statically checked by a compiler to verify that accesses to the dataset by the operation are type-safe, wherein the operation is configured to perform at least one of changing an ordering of the data elements in the dataset, changing a value of at least one of the data elements in the dataset, adding data elements to the dataset, and removing data elements from the dataset.

11. The computer-readable storage medium of claim 10, wherein the operation is parameterized by an element type parameter and a key type parameter.

12. The computer-readable storage medium of claim 10, wherein the interface includes a generic enumerator method parameterized by an element type parameter and a key type parameter.

13. The computer-readable storage medium of claim 12, wherein the generic enumerator method is configured to return an enumerator for enumerating over pairs of data elements and corresponding order keys in the dataset.

14. The computer-readable storage medium of claim 10, wherein the interface includes a generic compare method parameterized by a key type parameter, and wherein the generic compare method is configured to compare two of the order keys in the dataset and determine a smaller one of the two order keys.

15. The computer-readable storage medium of claim 10, wherein the interface is implemented as a generic class, and wherein the element type parameter and the key type parameters are generic type parameters.

16. A method of providing access to a dataset in a type-safe manner, comprising:
    storing a dataset including a plurality of data elements and a corresponding plurality of order keys for indicating an ordering of the data elements, each order key associated with one of the data elements;
    generating an interface to the dataset, wherein the dataset is implemented as a generic class that is parameterized by a generic element type parameter for identifying a type of data element and a generic key type parameter for identifying a type of order key, and wherein the interface is configured to provide access to the data elements and the order keys in the dataset in a type-safe manner; and
    performing an operation configured to operate on the dataset via the interface, wherein the operation is parameterized by a generic element type parameter and a generic key type parameter and is configured to be statically checked by a compiler to verify that accesses to the dataset by the operation are type-safe, and wherein the operation is configured to perform at least one of changing an ordering of the data elements in the dataset, changing a value of at least one of the data elements in the dataset, adding data elements to the dataset, and removing data elements from the dataset.

* * * * *